United States Patent [19]

Bertini et al.

[11] 4,293,318

[45] Oct. 6, 1981

[54] WET PURIFICATION OF GASEOUS MIXTURES CONTAINING DETERGENT POWDERS IN SUSPENSION

[75] Inventors: Fausto A. Bertini; Sergio Noe', both of Milan, Italy

[73] Assignee: Ballestra Chemica, S.p.A., Milan, Italy

[21] Appl. No.: 147,244

[22] Filed: May 6, 1980

[30] Foreign Application Priority Data

May 16, 1979 [IT] Italy ............................... 12598 A/79

[51] Int. Cl.³ ............................................. B01D 47/00
[52] U.S. Cl. .......................................... 55/85; 55/89; 34/32; 159/DIG. 10
[58] Field of Search .................... 55/85, 84, 87, 89; 159/4 R, 4 A, 4 GC, DIG. 10; 34/57 R, 79, 32; 260/505 N, 505 P, 504 S

[56] References Cited

U.S. PATENT DOCUMENTS 2,242,294  5/1941  Fox et al. ................................ 55/85
4,174,243  10/1979  Brooks et al. ....................... 159/4 A

OTHER PUBLICATIONS

Fieser & Fieser, Organic Chemistry, Reinhold Publishing Corp., N.Y., (1956), pp. 410–414.

Primary Examiner—Bernard Nozick
Attorney, Agent, or Firm—Robert E. Burns; Emmanuel J. Lobato; Bruce L. Adams

[57] ABSTRACT

The present invention relates to a method for the wet purification of gaseous mixtures containing detergent powders in suspension with 18–22 wt. % sodium chloride in aqueous solution.

4 Claims, 1 Drawing Figure

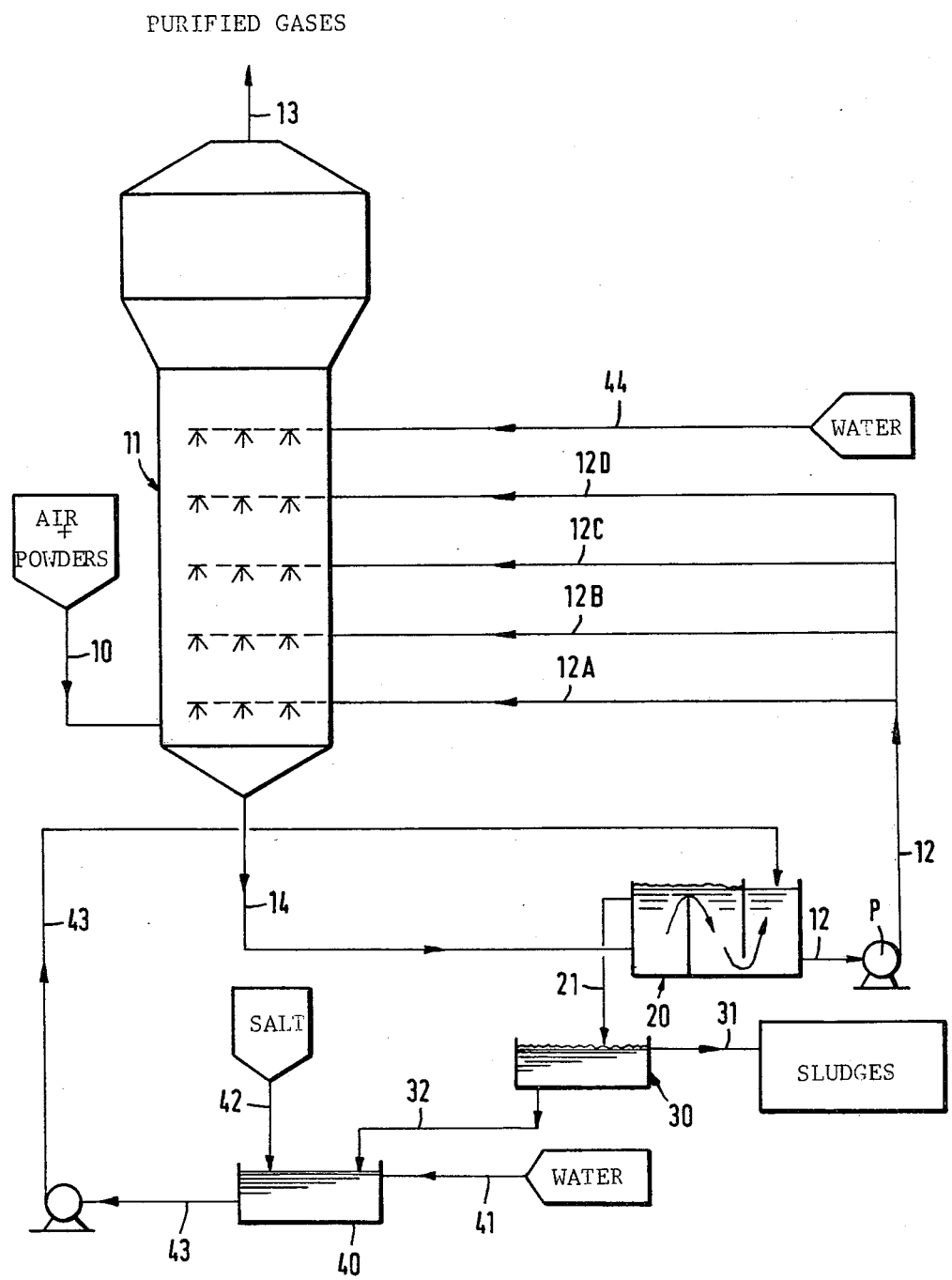

WET PURIFICATION OF GASEOUS MIXTURES CONTAINING DETERGENT POWDERS IN SUSPENSION

BACKGROUND OF THE INVENTION

Exhaust gases deriving from the production cycle in the detergent industry always contain quite considerable amounts of powder, which, if they are not captured in advance, escape to atmosphere together with the discharge gases, causing unacceptable levels of pollution. Although the main problem is to eliminate atmospheric pollution, the economic advantages deriving from the recovery of products which, once captured and collected in the form of aqueous solutions or suspensions (the method will be explained below), may be recycled, are also to be taken into account. In this way only the stream of purified gas is discharged from the system. The method with which the present invention is concerned is of the wet type because it is not advantageous, given the concentration and the fineness of the powder contained in the exhaust gases, to use a dry method.

A wet method is also preferable as a result of the fact that the exhaust gases may contain, in addition to detergent powders, organic products distilled during a spray drying stage, good extraction results being obtained for these products with the use of wet systems.

OBJECT OF THE INVENTION

The present invention provides a method for the wet purification of a gaseous mixture containing detergent powder in suspension (in particular detergent powders having a high content of active matter, possibly consisting entirely of active matter), in which a saline solution having a high concentration is used as washing liquid, the concentration being selected such that the detergent powder is insoluble in the saline washing solution.

BRIEF DESCRIPTION OF THE DRAWINGS

The invention will be described further, by way of example, with reference to the accompanying drawing, whose sole FIGURE is a block diagram of a wet purification method.

DESCRIPTION OF THE PREFERRED EMBODIMENTS

Air containing detergent powder is supplied from a conduit 10 to a washing unit 11 in the form of a column. The following description contains some indications in order to facilitate the choice of a washing unit which is most suited to the technique involved. A washing solution is supplied to the washing unit 11 by way of a conduit 12 divided, in the example illustrated, into parallel conduits 12A to 12D.

A conduit 13 extracts and discharges the air (purified of undesirable powders) to atmosphere.

It must be noted that, although the description of the drawing refers simply to "air", the gas conveying the powder may be any gaseous mixture, in particular the mixture resulting from the combustion with air of the fuel required for the production of heat required for the detergent production process.

The washing unit 11 also comprises a discharge conduit 14 for a solid-liquid suspension formed by the washing solution which has collected the powder contained in the gaseous mixture supplied via the conduit 10. This solid-liquid suspension, which has the consistency of a liquid sludge, is supplied to a collection tank 20 where a first separation of the suspension is carried out; the separated suspension, still quite dilute (dry content 20–25%), tends to stratify at the upper portion of the collection tank 20, whence it is fed to a final separator 30 via a conduit 21, by means of suitable drive means (not shown), such as pumps. The concentrated suspension is then removed via a conduit 31.

The washing solution (with the suspended powder substantially removed, having separated out) collects at the lower layers of the collection tank 20 and this washing solution is supplied via the conduit 12 to the washing unit 11 by means of a pump P.

Stratification of the solution containing the powder in suspension also takes place into layers in the separator 30. The clear solution from the separation stratifies into the lower layers of the separator 30 and is supplied, via a conduit 32, to a regeneration chamber 40.

Suitable amounts of a liquid medium constituting the solvent, generally water, are supplied to the chamber 40 from a conduit 41, whilst the solute, generally NaCl, is supplied from a conduit 42; the solvent and solute are supplied in quantities such as to restrict the solution fractions which may be carried away with the sludge via the conduit 31. The regenerated and reintegrated solution is supplied to the collection tank 20 via a conduit 43.

Washing may be carried out (according to a possible embodiment of the washing unit) in a contact stage column: at each of these contact stages the saline solution, supplied in the form of a fine spray, comes into contact with the powder particles present in the air (the conveyor gas) and weighs them down.

The centrifugal shock effects produced in the known way as a result of the particular geometry of the contact stage are, in the first instance, the actual cause of capture and then of extraction.

Since the sludge removed via the conduit 31 contains quite considerable amounts of water extracted from the saline washing solution, these amounts of water should preferably be re-integrated. This may be carried out both via the conduit 41, and by sending water directly, via a conduit 44, to the washing unit 11 in parallel to the saline solution supply provided by means of the conduits 12A to 12D.

The nature of the saline solution is of particular importance, in the sense that it may be considered as complementary to the type of product to be treated; a solution of sodium chloride at a concentration varying from 5 to 25% by weight in the solution in practice covers the entire range of products concerned in the detergent industry. The preferred concentration range is 18 to 22 wt. %.

A further very important factor is the recycling rate of flow which is also dependent on the type of product; the relationship expressed in l/h of recycling solution per m$^3$/h of air to be treated is preferably maintained in the optimum range of 0.1 to 1.0 whilst the air speed in the column in respect of the empty column preferably varies between a minimum value of 2 m/s and a maximum value of 5 m/s.

A combination of the above-mentioned parameters (salt concentration, recyling rate of flow, air speed) enables two results to be obtained, in the absence of which it is practically impossible to carry out the method. The two results are:

(1) the absence of foam formation: this means all the characteristic features of foam systems (high load losses, flooding, escape of foam, loss of efficiency);

(2) the insolubility of the detergent powder in the extraction solution (a function of the salt concentration alone).

The following description relates to the manner in which these effects are obtained. It has been shown that the capture of the powder by the solution takes place in the unit 11; the result of this is a solid-liquid suspension which may only be maintained as a suspension if it is subjected to strong agitation. On the other hand, in the absence of turbulence, its phases separate clearly and rapidly give way to a stratification in which the detergent (in the form of a slurry) floats on the clear saline solution; this takes place in the collection tank 20. This separation ability is due to the great difference between the densities of the two phases; it is thought that the relationship between these is approximately 3-4 times in favour of the heavier phases, i.e. the saline solution.

Whilst the saline solution is removed from the base of the tank 20 and recycled to the washing unit 11, the slurry which is still dilute (approximately 20% of dry matter) overflows from the top and is supplied to the final separation section 30, where, by means of suitable separators, the concentration of dry matter in the slurry reaches values in the range of 40 to 60%.

Although the above-described method is particularly designed for the extraction of powders containing a high percentage of active matter and therefore foaming matter, it may also be advantageously used for the extraction of normal detergent powders with normal active matter contents.

The advantage in the latter case lies in the possibility of considerably reducing the amount of water in the system combined with the extracted powder. If this amount is large it causes undesirable changes in the water equilibrium in the production plant for the detergent, to which this material is normally recycled for recovery. However, the method may also be used for the treatment of gases containing powders having a low content of active matter, so that it is able to adapt to the various operating conditions of the detergent production plant with which it is associated.

EXAMPLE

The purification of gas, in general combustion air or gas, containing detergent powder having a high content of active matter. The following are supplied to the washing unit 11 via the conduit 10:

| dry air | 87408 Kg/h |
| water vapor | 6992 Kg/h |
| dry powder material | 50 Kg/h |

The following are discharged to atmosphere via the conduit 13:

| dry air | 87408 Kg/h |
| water vapor | 9367 Kg/h |
| dry powder material | 3 Kg/h |

Obviously the increased water vapour being discharged from the conduit 13 in respect of that supplied from the conduit 10 is constituted by the water vapour generated in the washing unit 11 and deriving from the solvent leaving the conduit 12 and from the washing water leaving the conduit 44. It should also be noted that only approximately 6% of the powder entering the washing unit 11 via the conduit 10 is discharged with the air through the conduit 13.

The washing tower is supplied via the conduit 44 with
water: 2455 Kg/h

The solute, constituted by sodium chloride, is supplied at a rate of 30 Kg/h, in order to replace the solute removed with the sludge via the conduit 31. The following are discharged in the form of sludge from the separator 30 via the conduit 31:

| starting powder material | 47 Kg/h |
| water | 80 Kg/h |
| sodium chloride | 30 Kg/h |

The washing solution containing the following components is recycled through the conduit 12:

| water | 26367 Kg/h |
| starting powder material | 33 Kg/h |
| sodium chloride | 6600 Kg/h |

The temperature at which the air to be purified leaves the conduit 10 is approximately 100° C.

The temperature of the air passing through the conduit 13 at the output of the washing unit is approximately 53° C.

The temperature of the sludge which is discharged from the separator 30 is approximately 53° C. The temperature of the washing liquid circulating in the conduit 12 is the same, i.e. 53° C.

The water supplied via the conduit 44 has a temperature of 20° C.

What we claim is:

1. A method for the wet purification of a gaseous mixture coming from the production of detergent insoluble in a saline solution and containing powder of said detergent in suspension in a gas, comprising washing said gaseous mixture with an aqueous sodium chloride solution containing 18 to 22 wt. % of sodium chloride to form a solid-liquid suspension of said detergent powder in said sodium chloride solution, separating detergent from said solid-liquid suspension and recycling said sodium chloride solution, and exhausting the washed gas from which detergent powder has been removed by said washing.

2. A method as claimed in claim 1, in which the solid-gas suspension constituted by the gaseous mixture to be purified is supplied continuously to a washing phase; the solid-liquid suspension resulting from the washing phase is subjected to a first separation phase, from which the separated sodium chloride solution is directly recycled to the washing phase; and the sludge obtained from the first separation phase is supplied to a second separation phase, the resulting separated sodium chloride solution being regenerated and supplied to the washing phase.

3. A method as claimed in claim 1 in which the sodium chloride washing solution is supplied at a rate of 0.1 to 1/h for each m³/h of the gaseous mixture.

4. A method as claimed in claim 1 in which the speed of the gaseous mixture to be purified in 2 to 5 m/sec.

* * * * *